(12) United States Patent
Otero et al.

(10) Patent No.: US 8,937,627 B1
(45) Date of Patent: Jan. 20, 2015

(54) SEAMLESS VECTOR MAP TILES ACROSS MULTIPLE ZOOM LEVELS

(75) Inventors: Daniel Otero, Seattle, WA (US); James Darpinian, Seattle, WA (US); Jennifer Maurer, Seattle, WA (US); Brian Cornell, Kenmore, WA (US)

(73) Assignee: Google Inc., Mountain View, CA (US)

( * ) Notice: Subject to any disclaimer, the term of this patent is extended or adjusted under 35 U.S.C. 154(b) by 475 days.

(21) Appl. No.: 13/432,077

(22) Filed: Mar. 28, 2012

(51) Int. Cl.
*G09G 5/00* (2006.01)

(52) U.S. Cl.
USPC .......................................... 345/619; 345/660

(58) Field of Classification Search
CPC ................ G06F 17/30241; G06F 2203/04806; G06T 3/40
USPC .......................................... 345/619, 660–671
See application file for complete search history.

(56) References Cited

U.S. PATENT DOCUMENTS

| | | | |
|---|---|---|---|
| 5,519,809 A | 5/1996 | Husseiny et al. | |
| 5,864,632 A | 1/1999 | Ogawa et al. | |
| 5,966,135 A | 10/1999 | Roy et al. | |
| 6,314,370 B1 | 11/2001 | Curtright | |
| 6,388,684 B1 | 5/2002 | Iwamura et al. | |
| 6,577,714 B1 | 6/2003 | Darcie et al. | |
| 7,142,217 B2 | 11/2006 | Howard et al. | |
| 7,308,117 B2 | 12/2007 | Chitradon et al. | |
| 7,734,412 B2 * | 6/2010 | Shi et al. ...................... 701/421 | |
| 7,844,417 B2 | 11/2010 | Du | |
| 7,865,301 B2 | 1/2011 | Rasmussen et al. | |
| 7,933,897 B2 | 4/2011 | Jones et al. | |
| 7,945,546 B2 | 5/2011 | Bliss et al. | |
| 8,010,407 B1 | 8/2011 | Santoro et al. | |
| 8,014,946 B2 | 9/2011 | Rasmussen et al. | |
| 8,041,506 B2 | 10/2011 | Bliss et al. | |
| 8,130,245 B2 * | 3/2012 | Ham et al. ..................... 345/660 |
| 8,533,628 B2 * | 9/2013 | Rohrabaugh et al. ......... 715/815 |
| 8,750,845 B2 * | 6/2014 | Iwuchukwu ............... 455/414.3 |
| 2002/0113797 A1 | 8/2002 | Potter et al. | |
| 2004/0217980 A1 * | 11/2004 | Radburn et al. ................ 345/672 |
| 2005/0206657 A1 * | 9/2005 | Arcas ............................ 345/660 |
| 2005/0270311 A1 * | 12/2005 | Rasmussen et al. .......... 345/677 |
| 2005/0285876 A1 | 12/2005 | Balaga et al. | |
| 2006/0074660 A1 | 4/2006 | Waters et al. | |
| 2006/0139375 A1 | 6/2006 | Rasmussen et al. | |
| 2006/0170693 A1 * | 8/2006 | Bethune et al. ............... 345/568 |

(Continued)

OTHER PUBLICATIONS

Bing Maps AJAX Control, Version 7.0 (2011).

(Continued)

*Primary Examiner* — Hau Nguyen
*Assistant Examiner* — Ryan M Gray
(74) *Attorney, Agent, or Firm* — Marshall, Gerstein & Borun LLP

(57) ABSTRACT

Rendering map tiles with style data for zoom levels other than the style data intended for that tile at its nominal zoom level can be used to avoid abrupt changes between map tiles. Particularly when changing zoom levels, use of styles from more than one level may create an uneven look. To address this, either the new data may be displayed with the style for the previous zoom level or the old data may be presented with the style for the new zoom level style until all tiles for the new zoom level are received. At that time, all the map tiles may be displayed using the style for the new zoom level along with the map data intended for that zoom level. Displaying map tiles at a first zoom level using a progression of styles from other zoom levels may also be used when creating a perspective view map.

20 Claims, 8 Drawing Sheets

(56) References Cited

U.S. PATENT DOCUMENTS

| | | |
|---|---|---|
| 2006/0271281 A1 | 11/2006 | Ahn et al. |
| 2006/0293847 A1 | 12/2006 | Marriott et al. |
| 2007/0016651 A1 | 1/2007 | Blagsvedt et al. |
| 2007/0021908 A1 | 1/2007 | Jaugilas et al. |
| 2007/0050340 A1 | 3/2007 | von Kaenel et al. |
| 2007/0098211 A1* | 5/2007 | Walton et al. ............... 382/100 |
| 2007/0118520 A1 | 5/2007 | Bliss et al. |
| 2007/0176796 A1 | 8/2007 | Bliss et al. |
| 2007/0208498 A1 | 9/2007 | Barker et al. |
| 2007/0226314 A1 | 9/2007 | Eick et al. |
| 2007/0245238 A1 | 10/2007 | Fugitt et al. |
| 2008/0016472 A1 | 1/2008 | Rohlf et al. |
| 2008/0059889 A1* | 3/2008 | Parker et al. ............... 715/748 |
| 2008/0109159 A1 | 5/2008 | Shi et al. |
| 2008/0238941 A1 | 10/2008 | Kinnan et al. |
| 2009/0037441 A1* | 2/2009 | Howell et al. ............... 707/100 |
| 2009/0089149 A1 | 4/2009 | Lerner et al. |
| 2009/0113296 A1 | 4/2009 | Lacy et al. |
| 2009/0198767 A1 | 8/2009 | Jakobson et al. |
| 2009/0271718 A1 | 10/2009 | Balaishis et al. |
| 2010/0073391 A1* | 3/2010 | Horowitz et al. ............ 345/581 |
| 2010/0114941 A1 | 5/2010 | von Kaenel et al. |
| 2010/0118025 A1 | 5/2010 | Smith et al. |
| 2010/0194784 A1 | 8/2010 | Hoff et al. |
| 2010/0201707 A1 | 8/2010 | Rasmussen et al. |
| 2010/0321399 A1* | 12/2010 | Ellren et al. ............... 345/587 |
| 2011/0004830 A1 | 1/2011 | Von Kaenel et al. |
| 2011/0063301 A1* | 3/2011 | Setlur et al. ............... 345/441 |
| 2011/0131376 A1* | 6/2011 | Fischer ..................... 711/119 |
| 2011/0153186 A1 | 6/2011 | Jakobson |
| 2011/0172909 A1 | 7/2011 | Kahn et al. |
| 2011/0177845 A1* | 7/2011 | Fasold ..................... 455/566 |
| 2011/0191014 A1* | 8/2011 | Feng et al. ............... 701/200 |
| 2011/0207446 A1* | 8/2011 | Iwuchukwu ............... 455/414.3 |
| 2011/0208724 A1 | 8/2011 | Jones et al. |
| 2011/0267369 A1 | 11/2011 | Olsen |
| 2011/0306304 A1 | 12/2011 | Forutanpour et al. |
| 2011/0313649 A1* | 12/2011 | Bales et al. ............... 701/200 |
| 2012/0158762 A1* | 6/2012 | Iwuchukwu ............... 707/759 |
| 2012/0206469 A1* | 8/2012 | Hulubei et al. ............ 345/581 |
| 2013/0097133 A1* | 4/2013 | Grandhi et al. ............ 707/695 |

OTHER PUBLICATIONS

Bing Services, "Getting Started with V4 of the API (Part 1)," Microsoft (2011). Retreived from the Internet on Sep. 26, 2011: <URL:http://msdn.microsoft.com/en-us/library/aa907678.aspx>.

Neoseeker, "Bing Maps Combines Raster Tiles and Vector Graphics for Enhanced Experience," Neo Era Media Inc. (1999-2011). Retreived from the Internet on Sep. 26, 2011: <URL:http://www.neoseeker.com/news/14507-bing-maps-combines-raster-tiles-and-vector-graphics-for-enhanced-experience>.

Sample et al., "Tile-Based Geospatial Information System: Principles and Practices," pp. xi-xiv, 193-203 (Springer 2010).

* cited by examiner

|  | Feature | | | |
|---|---|---|---|---|
| Label Style | Road Fill Color | Road Border Thickness | Road Width | Rim Color |
| LS₁ | Blk | 1 | 2 | Blk |
| LS₂ | Blk | 1 | 2 | Blk |
| ⋮ | ⋮ | ⋮ | ⋮ | ⋮ |
| LS₁₈ | Gry | 2 | 8 | Blu |
| LS₁₉ | DkGry | 3 | 12 | Dk Blu |
|  |  |  |  |  |

FIG. 2

SEAMLESS VECTOR MAP TILES ACROSS MULTIPLE ZOOM LEVELS

FIELD OF THE DISCLOSURE

The present disclosure relates to map rendering systems, such as electronic map display systems, and more specifically to a map rendering system that renders map elements using style data from different zoom levels across concurrently displayed map data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, maps of geographic regions may be displayed by software applications running on a wide variety of devices, including mobile phones, car navigation systems, hand-held global positioning system (GPS) units, tablets, laptops, and other computers. Depending on the application and/or user preferences, maps may display topographical data, street data, urban transit information, traffic data, etc. Further, some applications display maps in an interactive mode, so that a user may operate various controls (radio buttons, scrollbars, etc.) to change the zoom level or pan the "camera" to a new location, for example. A user in some cases also may select or unselect the display of certain information. For example, the user may operate the appropriate control to turn on the display of bicycle trails.

In at least some vector mapping systems, the map data to be displayed is downloaded as tiles of vector data specified for a certain zoom level. The vector data is rendered using style information for the specified zoom level.

SUMMARY

In an embodiment, a method of rendering graphical map information on a display of a computer device uses zoom level-specific styles to display a first map tile of graphical map information on a portion of the display of the computer device at a first zoom level using a zoom level style corresponding to the first zoom level and displays a second map tile of graphical information on a second portion of the display of the computer device at the same time as displaying the first map tile. Displaying the second map tile includes determining a zoom level style associated with a nominal use of the second map tile and displaying the second map tile using a zoom level style different from the zoom level style associated with the nominal use of the second map tile.

In another embodiment, a method in a map client at a client device used for rendering a map image at discrete zoom levels receives, at the client device, style information including zoom level specific styles for rendering map data at each discrete zoom level. For a first map data designated for display at a first zoom level, displaying the first map data at the first zoom level using a corresponding first zoom level style and displaying, contemporaneously with and contiguous to the first map data, a second map data designated for a second zoom level, wherein the second map data is displayed using the first zoom level style.

In yet another embodiment, a client device may be adapted to execute software code on a processor to display map data on a display of the client device. The client device may include a first module executed on the processor that receives map tile information and style data by zoom level, each map tile having a corresponding style data specifying style information unique to each zoom level and a second module executed on the processor that receives user input from a user interface including an indication to change from a first zoom level to a second zoom level. The client device may also include a third module executed on the processor that i) displays a first map tile with data for a first zoom level at the first zoom level using style information for the first zoom level and ii) concurrently displays a second map tile with data for a second zoom level at the first zoom level using, at least in part, style information for the first zoom level.

BRIEF DESCRIPTION OF THE DRAWINGS

FIG. 2 is a table showing exemplary visual styles by zoom level;

DETAILED DESCRIPTION

Figure 1:
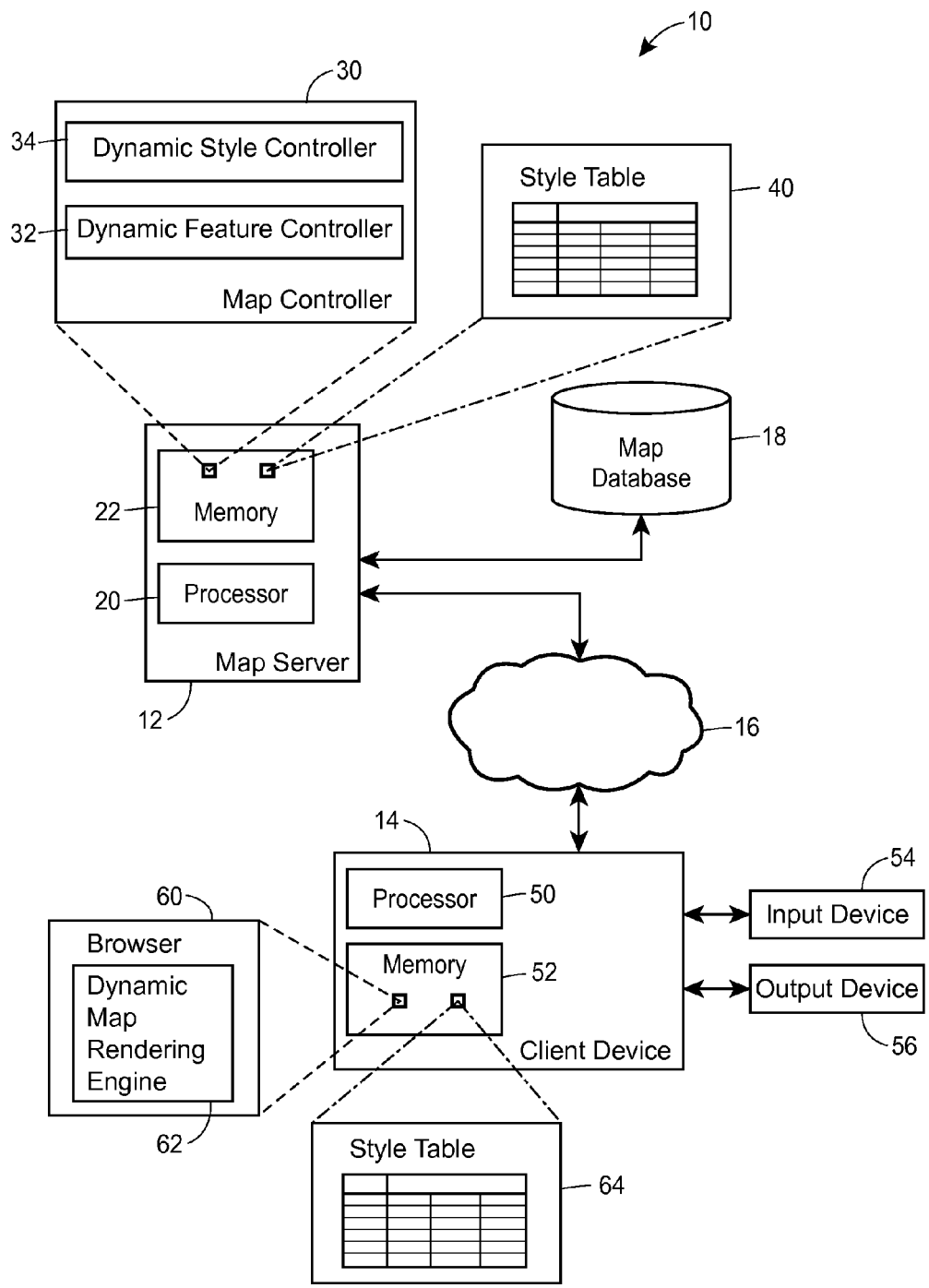
FIG. 1 is a block diagram of a system in which a server provides map content to a client device for rendering a map image across zoom levels or zoom level styles at the client device, according to an embodiment.

The use of map styles across zoom levels allows the seamless display of map data when there is a mismatch of map data and styles on a display at the same time. There are many circumstances in which map data, or map tile, from one zoom level may be displayed with different map data, or map tile, from another zoom level. Overlaying zoom-level specific styles on each map tile will cause a visual mismatch. This is particularly true when using vector map data, where the style is often applied at the client device using zoom-level specific styles.

The term map tile was originally used to describe a raster view of an area at a particular zoom level. The use of vector map data can blur the concept of a map tile because some vector descriptions of map features can be used at multiple zoom levels. However, the concept of tile is useful even for vector map data in that there are panning operations or changes in zoom level that result in the importation of new data, either adjacent to map data currently displayed or map data with different amounts of detail for the same geographic area.

To render a map image in a web browser or another application, the client device may request map data from the map server via a communication network, and the map server in response may provide vector data that describes map content as well as style data that indicates how the vector data should be rendered. More particularly, vector data may specify various geometric shapes (e.g., using mathematical descriptions) and indicate how these shapes should be positioned for rendering various map elements such as roads, buildings, parks, bodies of water, text, icons, etc., while style data may describe such visual characteristics or properties such as font and text sizes as well as line thickness (e.g., width in pixels), line color, one or more fill colors, etc., for various visual styles that may be applied to the vector data. The map server also may specify which visual styles the client device should apply to various vector-based descriptions of map elements.

Style information generally matches the zoom level for which the map data is targeted. Map data may be nominally targeted for a particular zoom level. For example, a tile of vector data for a street map at zoom level 15 may have a corresponding style set for that zoom level, designating various road widths, road edge line styles, feature and fill colors, etc. Tiles of map data with a nominal use designated for another zoom level may have corresponding different style sets, appropriate to each zoom level. To continue with the example, a tile of vector data for zoom level 16 that covers a portion of the same geographic area as above may have different road widths, road edge styles, fill colors, etc.

However, several situations may occur for which a tile designated for use at a nominal zoom level may not use the corresponding style for that zoom level. For example, a tile may be displayed at a zoom level other than its nominal zoom level while waiting for a tile designated for that zoom level. In other examples, a style may not be available for a particular tile at the currently displayed zoom level, a network interruption may have caused new data to be incomplete or unavailable, or a style mismatch may exist between adjacent tiles, particularly when data is in transit to the map application. In these and other similar cases the visual mismatches between tiles can be reduced by selectively displaying map data for one zoom level using style information for a different zoom level.

When zooming between levels, particularly when zooming between adjacent or nearly-adjacent levels, the visual presentation of the change between zoom levels can be smoothed as new tiles are received by changing the style of currently displayed data to a style of the new zoom level as adjacent tile data is displayed. Alternatively, newly received map data can be displayed using the old zoom level style information until all new map tiles are received and the styles of each tile are updated in a coordinated fashion.

For example, when updating adjacent map tiles to a new zoom level, there may often be a period of time during the updating process when new map data is available for one tile but not the other. Similarly, new data for a map tile may be displayed as the data is received, but other map tiles may not be using the same style as the data being received. When displaying the new data with style information for the new zoom level there may be a dramatic mismatch in styles at the border between the tile with new data and the tile with old data displayed at the old style.

Before returning to this topic in detail, a brief discussion of mapping basics and mapping system elements is presented. To render a map image in a web browser or another application, a client device may request map data from the map server via a communication network, and the map server in response may provide vector data and, in some cases, text data that describes map content. In addition, style data may also be received that indicates how the vector data and the text data should be rendered. More particularly, vector data may specify various geometric shapes (e.g., using mathematical descriptions) and indicate how these shapes should be positioned for rendering various map elements such as roads, buildings, parks, bodies of water, etc., while style data may describe such visual characteristics or properties as line thickness (e.g., width in pixels), line color, one or more fill colors, etc. for various visual styles that may be applied to the vector data. Text data may specify map labels to be displayed for individual or aggregate map elements, for example, and style data may be applied to the text data to render the text using a particular size, color, font, etc. The map server may specify which visual styles the client device should apply to various vector-based descriptions of map elements (also referred to herein as vector descriptors or simply vectors). The style data may be sent with each map tile update, but in some embodiments, a style table may be downloaded that describes styles by zoom level and by map type. The style table may persist through the mapping session, or as memory considerations permit, the style table may be stored on the device permanently until the memory is needed or until the style table is obsolete.

In some embodiments, a map server indicates which visual style applies to a vector-based description of a map element for a particular map type at a particular zoom level, such as terrain, transit, traffic, bicycle trail, etc., at a particular zoom level, such as levels 1-19. While there are several ways to group and index styles, for simplicity sake, this description will simply use an example with some elements of street map types at particular zoom levels. A more complete discussion of style tables may be found in co-pending U.S. patent application Ser. No. 13/237,830, filed on Sep. 20, 2011, titled, "Rendering a Map Using Style Identifiers," which is hereby incorporated by reference for all purposes.

Referring to FIG. 1, a system for supporting client device map applications and map data transfers includes a map server 12, a client device 14 communicatively coupled to the map server 12 via a network 16, and a map database 18 communicatively coupled to the map server 12. The network 16 may be a wide area network (WAN) such as the Internet, a local area network (LAN), or any other suitable type of a network. Depending on the embodiment, the map database 18 is coupled to the map server 12 via the network 16 or via another communication link as illustrated in FIG. 1. For simplicity, only one instance of the map server 12, the client device 14, and the map database 18 is illustrated in FIG. 1. However, in other embodiments, the system 10 may include more than one map server 12, more than one client device 14, and/or more than one map database 18.

The map server 12 may include a processor 20 and a computer-readable memory 22 that stores a map controller 30 in the form of computer instructions, for example, that may be executable on the processor 20 directly (e.g., as compiled code) or indirectly (e.g., as a script interpreted by another application executing on the processor 20). The computer-readable memory 22 may include volatile memory to store computer instructions and data on which the computer instructions operate at runtime (e.g., Random Access Memory or RAM) and, in an embodiment, persistent memory such as a hard disk, for example. In an embodiment, the map controller 30 includes a dynamic feature controller 32 that generates vector data for various map elements that are provided as map content to the client device 14. As used herein, a map feature (or simply feature) may correspond to an individual map element such as a building or an aggregation of several map elements such as several buildings, a park, and several pedestrian paths of a college campus. In general, a map feature may be described using one or more vector descriptors.

The map controller 30 may also include a style controller 34 to provide style data to the client 14. The style controller 34 may provide style data along with vector data provided by the dynamic feature controller 32 in response to various events including receiving a request for map data including map content and style data from the client device 14 or receiving a request for specified styles from the client device 14, among others.

With continued reference to FIG. 1, the client device 14 may include a processor 50 to execute instructions and a memory 52 to store instructions and data. The client device 14 also may include an input device 54 and an output device 56 to receive input from a user and provide output to the user, respectively. The input device 54 may include one or more of a keyboard, a mouse, and a touchscreen, and the output device 56 may include a touchscreen or another type of a monitor, for example. The client device 14 may include various software components, such as device drivers, operating system (OS) event handlers, etc. to control the input device 54 and the output device 56 so as to implement an interactive user interface. Further, software applications executing on the processor 50 may utilize these software components to provide an application-specific user interface.

In an embodiment, the client device 14 is a so-called thin client that depends on another computing device for certain computing and/or storage functions. For example, in one such embodiment, the memory 52 includes only volatile memory such as RAM, and a program and/or storage unit having persistent memory is external to the client device 14. In another embodiment, the memory 52 includes both volatile and persistent memory components. The memory 52 may be a physical memory having tangible storage locations embodied in physical locations using a manufacturing process and does not include propagated media.

A browser application 60 may include a set of computer-readable instructions that execute on the processor 50. In general, the browser application 60 accesses web pages that include content such as text, images, embedded video, etc. and instructions in a mark-up language such as Hypertext Markup Language (HTML), and renders the content on the output device 56 according to the instructions in the mark-up language. To this end, the browser application 60 may implement functions for generating and processing data packets that conform to the Hypertext Transfer Protocol (HTTP), parse HTML content, encode data according to the Secure Socket Layer (SSL) protocol, request and verify digital certificates, etc., as well as user interface functions for receiving various user commands related to navigation, rendering, and managing web page data. In some embodiments, the browser application 60 is configured to interpret instructions in a scripting language (e.g., Javascript) provided in a web page.

A dynamic map rendering engine 62 may execute as a component of the browser application 60. Depending on the embodiment, the dynamic map rendering engine 62 may be a plugin (e.g., a set of compiled instructions that extends the functionality of the browser application 60 and executes on the processor 50), a script (e.g., a set of instructions in a scripting language interpreted by the browser application 60 at runtime), or another suitable software component. According to one example scenario, the dynamic map rendering engine 62 is downloaded when a user operating the client device 14 visits a web page that includes an embedded interactive map. More specifically, the web page may include a first hyperlink to an online map server and a certain geographic location as well as a second hyperlink to a copy of the browser application 60, which is required for rendering map data received from the online map server according to the first hyperlink.

Both the client device 14, map server 12, and related equipment may incorporate computer memory that stores data in physical media and is separate from a carrier wave or other transmission media. The methods described herein may be performed using software stored in one or more such computer memories and executed on one more processors of the client device 14, map server 12 or other related hardware, such as networking equipment.

During operation, the dynamic map rendering engine 62 may receive vector data and style data from the map server 12, generate corresponding map images using the received vector data and the style data, and cause the map image to be displayed within a certain region allocated by the browser application 60. The dynamic map rendering engine 62 may also store available style data in a style table 64, which is disposed in the memory 52.

In at least some of embodiments, the dynamic map rendering engine 62 receives vector data that specifies geometric shapes using mathematical descriptions of points and paths connecting the points. For example, rather than specifying each pixel that makes up a raster image of a line segment, vector data may specify the two endpoints of the line segment and indicate that the two endpoints are connected by a straight line. The dynamic map rendering engine 62 then may apply style data as appropriate to the specified line segment, so that the line segment is displayed with a particular color, width, etc. As another example, the vector data may specify the contour of a triangle, and the corresponding style data may specify the color of the contour lines, the width of the contour lines, and the color of the interior region of the triangle. In other words, rather than receiving raster images from the map server 12, the dynamic map rendering engine 62 may receive instructions for drawing a map image on the output device 56 and execute the instructions so as to generate a raster map image. In some cases, however, vector data also may include raster images as certain component elements that cannot be easily represented in a vector format.

For simplicity, the client device 14 is illustrated with a single processor 50. However, the client device 14 in other embodiments may include additional processing units (not shown) such as a graphics processing unit (GPU) configured to facilitate image rendering on the output device 56, for example. Further, in an embodiment, the browser application 60 may utilize a library of graphics functions for efficiently generating a map image. For example, the memory 52 may store a plugin, such as an OpenGL® or Direct3D® library, having functions for rendering graphics which various applications executing on the client 14, including the browser application 60, may access via an application programming interface (API). In another embodiment, the memory 52 may store a browser incorporating WebGL, or may store a plugin particularly suitable for browser applications. Also, in some embodiments, the memory 52 stores additional software components that facilitate efficient rendering of images via the output device 56. For example, the memory 52 may store an Adobe® Flash® plugin or an O3D plugin.

The client device 14 may store in memory 52 executable modules that when executed on the processor cause the dynamic map rendering engine 62 of the client device 14 to perform specialized functions associated with map display. The memory 52 may include a first module that receives map tile information and style data by zoom level, where each map tile has corresponding style data specifying style information unique to each zoom level. The memory 52 may include a second module that receives user input from a user interface including an indication to change from a first zoom level to a second zoom level. The memory may include a third module that i) displays a first map tile with data for a first zoom level at the first zoom level using style information for the first zoom level and ii) concurrently displays at the first zoom level, a second map tile with data for a second zoom level using, at least in part, style information for the first zoom level. The third module may display a portion of the second map tile using the style information for the first zoom level during a time when the second map tile is downloading, and the third module may display the second map tile using style information for the second zoom level after the second map tile is downloaded in full.

FIG. 2 is a table 200 showing exemplary visual styles by zoom level, the same as or similar to style table 64 of FIG. 1. In this simplified illustration, rows of level styles include Level Style 1 ($LS_1$) 203, that for the sake of illustration is applied to zoom level 1. Level Styles 2-19 are represented by the rows illustrated in FIG. 2 as Level Style 2 ($LS_2$) 204, Level Style 18 ($LS_{18}$) 205, and Level Style 19 ($LS_{19}$) 206, each applicable to its respective zoom level. For each respective level style 201, table 200 of FIG. 2 illustrates style information associated with respective map feature data. For example, for $LS_1$ 203 road fill color 207 is black 212, road border thickness 208 is a measure of 1 214, road width 209 is a measure of 2 215, and river color 210 is black 216. An examination of the remainder of table 200 shows that as the zoom levels increase, there may be changes in styles for map elements such as line widths and fill colors. Note that there are many choices for the actual format of the style data depicted in FIG. 2 for size, speed, or other considerations. Alternate formats of the style data do not affect the principles described herein.

Figure 3:
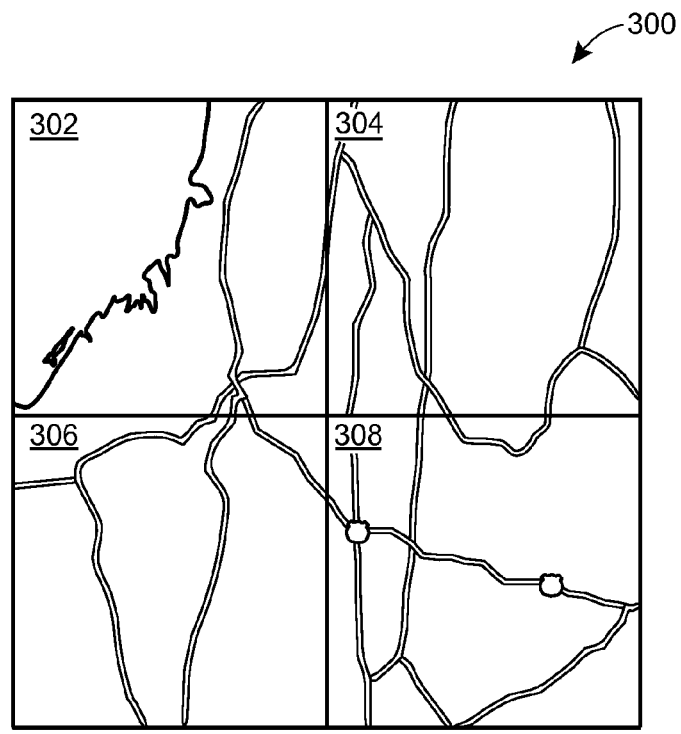
FIG. 3 is an illustration of a basic map at a first zoom level.

FIG. 3 is an illustration of a basic map 300 at a first zoom level. The map 300 is made up of 4 contiguous map tiles 302, 304, 306 and 308. The map features of each tile are displayed using the same style data, for example the roads and coastline have the same line widths and fill colors across the tiles.

Figure 4:
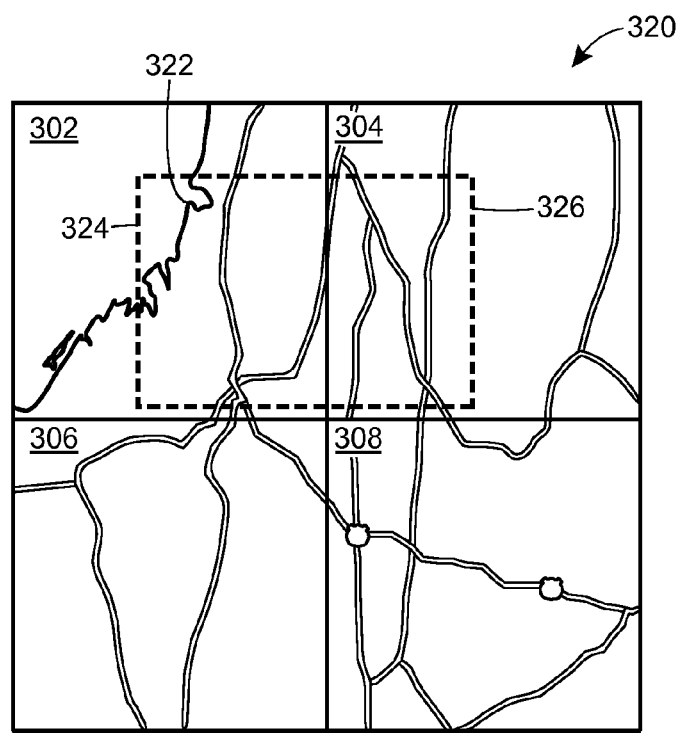
FIG. 4 is an illustration of the basic map of FIG. 3 showing a zoom area.

FIG. 4 is an illustration of a basic map 320 matching the basic map 300 of FIG. 3, showing a zoom area 322 that will be made up of two tiles 324 and 326. In practice, each zoom action may produce four tiles, but for the sake of simplicity, two tiles will be used. The concepts discussed are applicable to any number of contiguous tiles. For the sake of illustration, the basic map of 320 of FIG. 4 is designated as being at zoom level 18. The map features are drawn using a corresponding style $LS_{18}$, that describes the styles for line widths, feature characteristics, fill colors, etc., as discussed above with respect to the discussion of styles in FIG. 2. The zoom area 322 is shown in more detail in FIGS. 5A-5B and 6, discussed below.

Figure 5A:
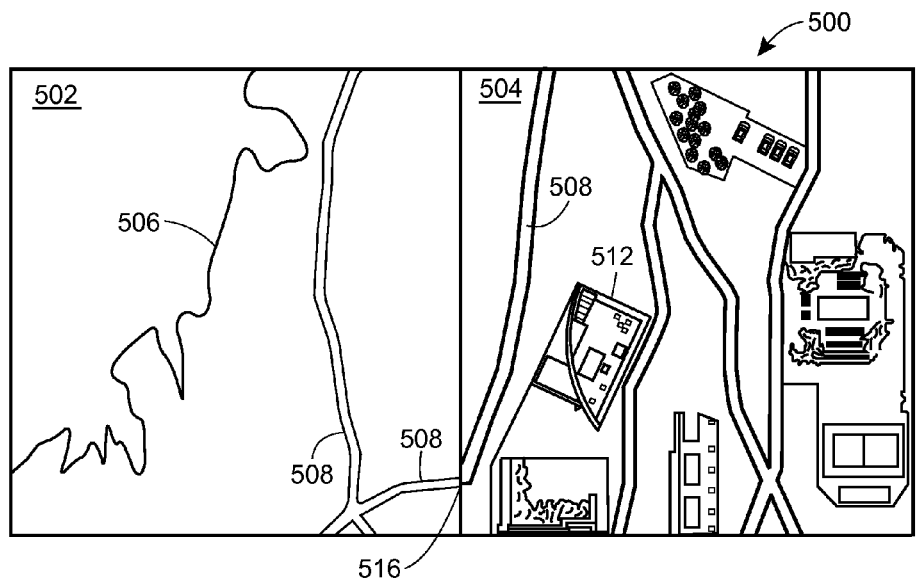
FIG. 5A is an illustration of a the zoom area of FIG. 4 using a first map data update process.

FIG. 5A illustrates an intermediate step in one method of updating map data during zoom level changes. In this illustration, FIG. 5A shows a display area 500 with tile 502 corresponding to zoom area 322 of FIG. 4 during a map update process associated with, for example, zooming in from zoom level 18 to zoom level 19. Note that zooming without any associated pan operation will always encompass at least some overlapping region of the previous zoom level. In many scenarios, complete updated data for each tile at a new zoom level may not always be available. This situation may occur, for example, if the complete data for tile 502 at zoom level 19 has not yet been received or processed, or is in the process of being displayed as data is arriving, and is therefore incomplete. Other scenarios may also account for reusing data at another zoom level, for example, there may be no additional map feature data for the new zoom level.

As illustrated in FIG. 5A, a first representative tile 502 is shown at the higher zoom level, but is reusing the map feature data from the previous zoom level. That is, data from zoom level 18 is illustrated being redrawn at an expanded scale for zoom level 19. In this example, tile 502 is drawn using the style for zoom level 18, $LS_{18}$. A second representative tile 504 has data for the new zoom level 19, showing additional features not illustrated at the previous zoom level, zoom level 18, as shown, for example, in tile 304 of FIG. 4, see e.g., building 512. Map tile 504 is drawn using the style for zoom level 19, $LS_{19}$. As illustrated, the lines for road edges 508 are darker and the road widths are wider compared to adjacent tile 502. When the two tiles are drawn according to their respective styles, $LS_{18}$ for tile 502 and $LS_{19}$ for tile 504, the two halves will have a visible discontinuity at a point 516 where the feature(s) for each tile meet, but are drawn using different styles. The visual mismatch between tiles 502 and 504 is apparent, not only in level of detail, but even more so in the style mismatch.

Figure 5B:
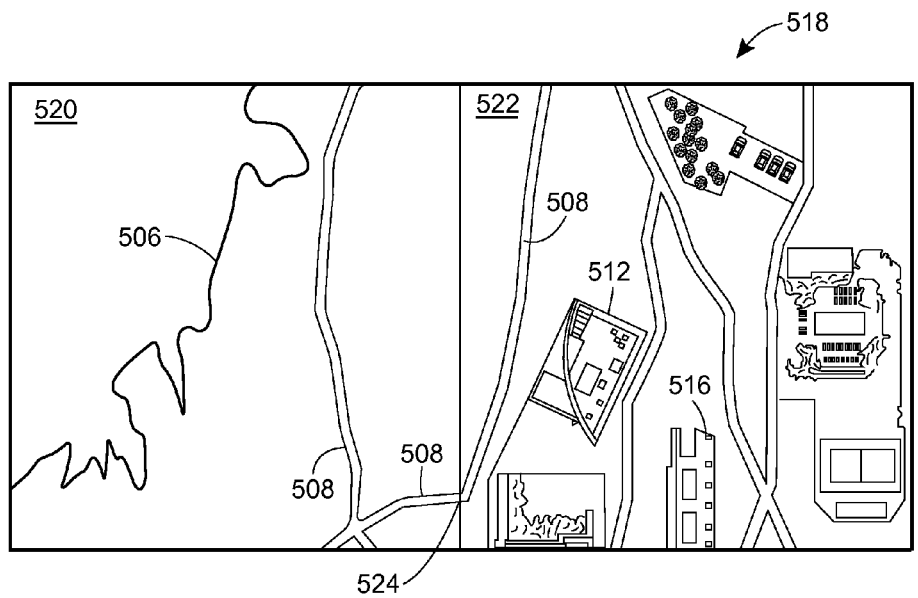
FIG. 5B is an illustration of a the zoom area of FIG. 4 using a second map data update process.

To accommodate a smoother visual transition when changing between zoom levels, FIG. 5B illustrates an alternate technique of displaying the updated map feature data in a display area 518 when changing zoom levels. Tile 520, corresponding to tile 502 from FIG. 5A, is drawn as described above, with map feature data from the previous zoom level (level 18) drawn using style $LS_{18}$, also from the previous style. Tile 522 is drawn using updated data for zoom level 19, showing additional detail not found in zoom level 18. As illustrated, tile 522 is also drawn using style data for zoom level 18, $LS_{18}$, so that, in contrast to FIG. 5A, both map tiles 520 and 522 are drawn using the style from zoom level 18, $LS_{18}$. The additional feature data for tile 522 is visible, but the glaring difference in styles is not present and the feature(s) that bridge between the two tiles match at the boundary 524.

Figure 6:
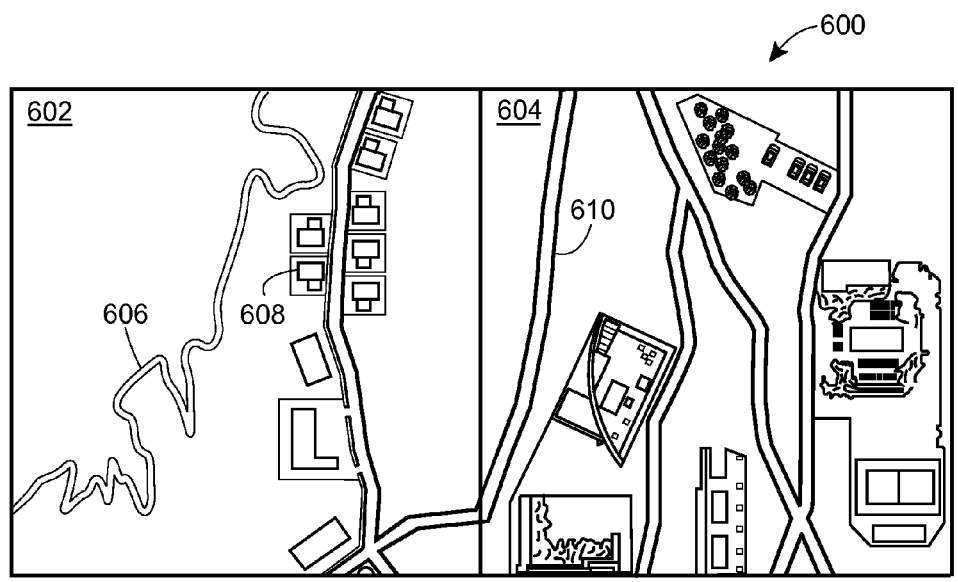
FIG. 6 is an illustration of the zoom area of FIG. 4 after the map update process of FIG. 5A or 5B.

FIG. 6 illustrates the completed process for updating zoom levels. When the data for zoom level 19 is downloaded and processed, the map tile 602 can be updated with the additional detail available at that level. When the data for both map tiles 602 and 604 for zoom level 19 is available, the styles for both map tiles can be changed in unison, using the new road widths, road border thicknesses, fills, etc., specified by the style for level 19, $LS_{19}$ for elements such as the coastline 606, building outlines 608, and roads 610.

Even in the scenario where no new map data is available for map tile 602, the map feature data may updated using the style from the previous zoom level and the style for both can be changed together when all the data is ready to display.

Alternatively, the process can be implemented using the new style during the transition period. That is, during the interim period illustrated in FIG. 5B, the style for zoom level 19, $LS_{19}$, can be used for both map tiles 502 and 504. This may be advantageous when no new data is expected for tile 502 so that as data is being loaded for map tile 504, the styles will be consistent throughout.

Figure 7A:
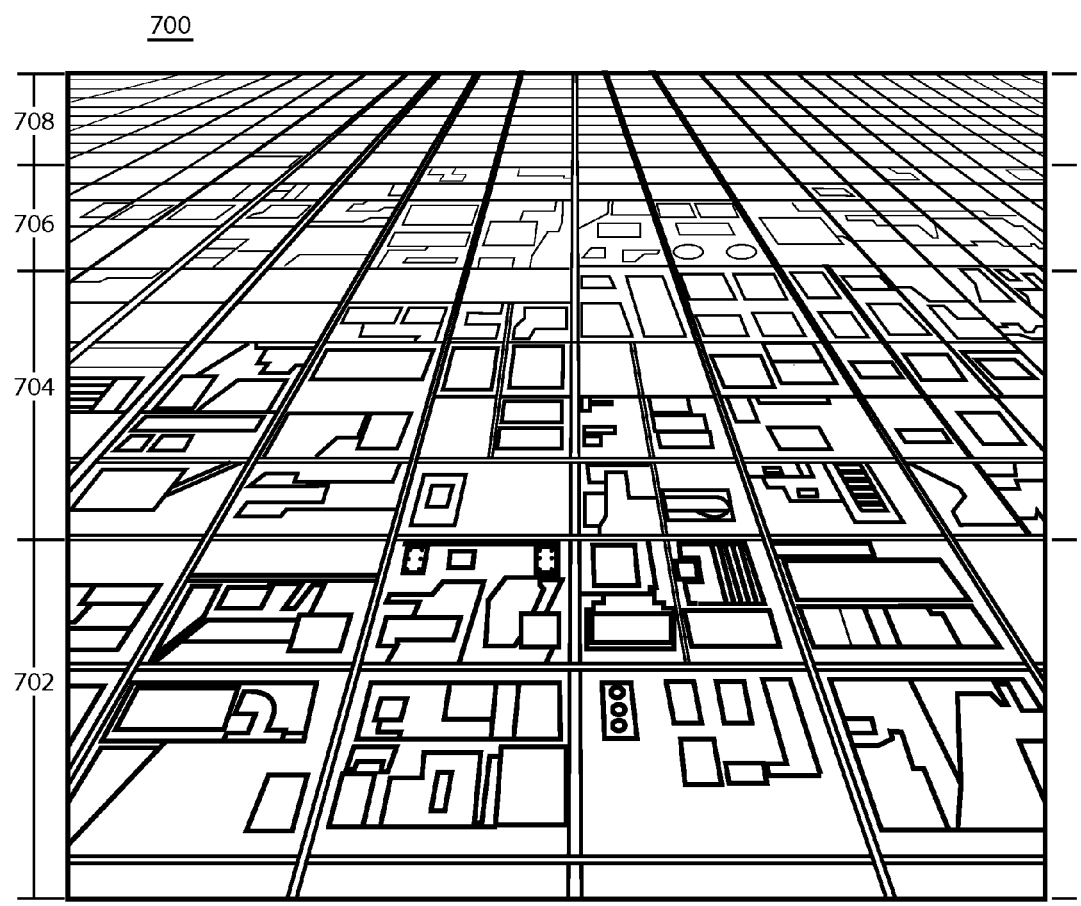
FIG. 7A is an illustration of a map displayed in a perspective view using sequential zoom styles.

FIG. 7A illustrates a map 700 displayed in a perspective view using interpolated styles. When rendering a map in perspective, map data for a single level, e.g., the front-most tile may be used to render the drawing. In this case, however, using style information from the front-most tile for the rear-most tiles would result in dark, wide lines for roads and buildings and ultimately, overlapping image elements. To address this situation, style information may be interpolated from the front to the back of the perspective view.

In the illustration of FIG. 7A, elements in a first rank 702 may be drawn with the appropriate style, for example, $LS_{15}$ for zoom level 15. Horizontal street widths are fixed and building outlines are relatively dark.

Elements in a second rank, 704 may be drawn using a lower zoom level style, for example, $LS_{12}$, applicable to zoom level 12. In the second rank, compared to corresponding elements in the first rank 702, horizontal streets are narrower and their line thicknesses are thinner, building outlines are lighter. Fill colors, if used, may be lighter or more transparent, according to style rules.

At a third rank 706, horizontal streets are reduced to a single line and building outlines are thinner than previous ranks, according to a lower zoom level style, e.g., $LS_{10}$. For map elements with lower priorities, such as smaller buildings, parks, etc., the line thicknesses may be reduced to zero and therefore may not drawn at all. In one embodiment, a zoom level style for map elements in this rank would be two or more zoom levels removed from the zoom level style in the first rank so that interpolation of zoom level styles is not necessary and may save some processing steps when used on a low powered platform. However, interpolation of zoom level styles may also be used, for example, to smooth transitions between ranks or when using a limited amount of map data. See, e.g., the discussion below related to FIG. 7B.

Elements in a fourth rank 708 may use such a low-level style, e.g., $LS_{08}$ for zoom level 8, that all elements but the major cross streets may hidden by virtue of having their corresponding features use zero line widths.

As illustrated in this simplistic example, the appearance of distance and perspective can be accomplished simply by applying appropriate zoom level styles to map tiles in the progression of tiles without respect to the actual zoom level for which the data is intended. As illustrated in FIG. 7A, four ranks are drawn using selected styles. Other embodiments could include all ranks from the front-most to zoom level 0 or 1 at the back.

Figure 7B:
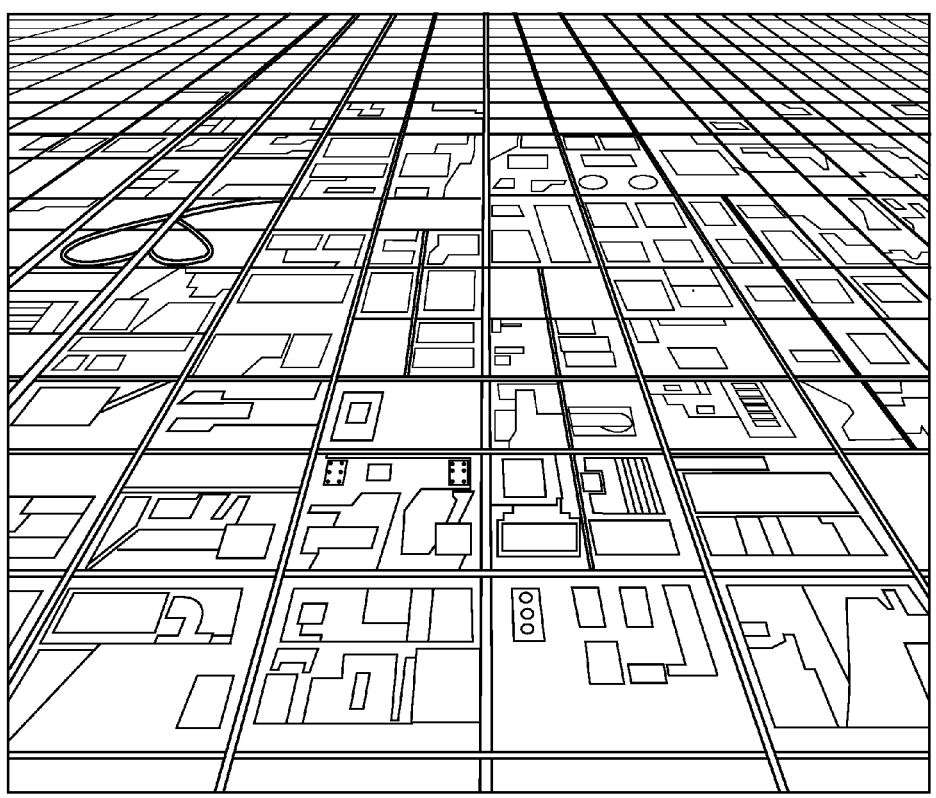
FIG. 7B is an illustration of a map tile displayed in a perspective view using a continuously interpolated style.

FIG. 7B is an illustration of a map tile displayed in a perspective view using a continuously interpolated style. In this embodiment, the styles may be more or less continuously interpolated to give even smoother transitions front-to-back. By evaluating a current zoom level style at the front of the map image and a zoom level at the rear, an equation for feature scaling may be developed based on, for example, the ratio of feature scales from the front to the back. The equation may be applied to features based on the front-to-back location of a feature or even to elements of the feature. Other techniques for developing continuous scaling may also be used, such as front-to-back relative feature size or interpolation of zoom level styles between a desired front feature size and a desired back feature size. While a continuous interpolation may be applied across multiple tiles, the technique is equally applicable to provide perspective to a single tile.

Figure 8:
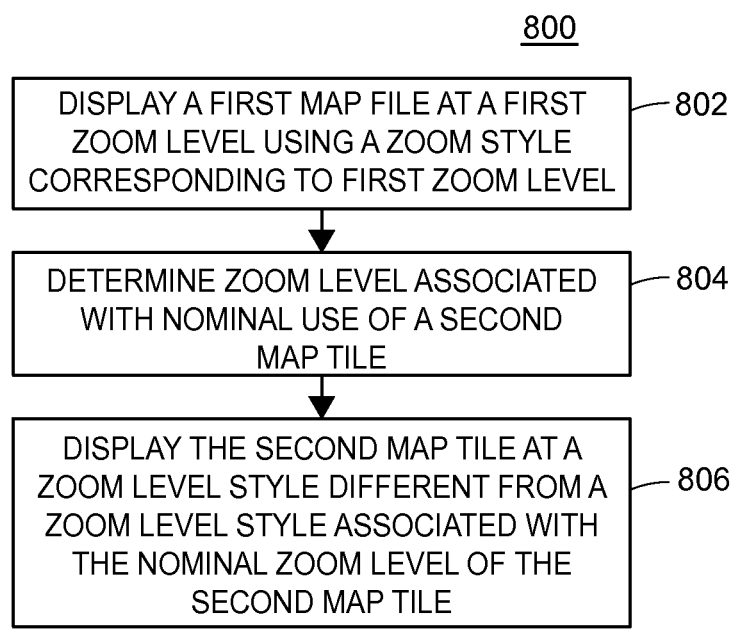
FIG. 8 is a method rendering map information on a display of a computer device.

FIG. 8 is a method 800 of rendering map information on a display of a computer device. At block 802, a first map tile of graphical map information may be displayed on a portion of the display of the computer device at a first zoom level using a zoom level style corresponding to the first zoom level. For example, if the first zoom level is zoom level 15, the graphical map information is designed for use at zoom level 15 and the graphical map information is displayed using a style designed for use at zoom level 15.

At block 804, a zoom level style associated with a nominal use of the second map tile may be determined.

At block 806, the second map tile may be displayed, along with the first map tile. The first and second map tiles may be displayed at the same time (contemporaneously) and may be displayed with one common edge (contiguously). The second map tile may be displayed using a zoom level style different from the zoom level style associated with the nominal use of the second map tile. For example, if the second map tile has a nominal use at the first zoom level, that is, the same zoom level as the first map tile, the second map tile may be displayed using a zoom level style corresponding to a zoom level other than the first zoom level. In one embodiment, this may occur when displaying the first and second map tiles in a perspective view as discussed above with respect to FIG. 7. In that case, the second map tile may be displayed graphically above the first map tile and the second map tile may be displayed using a zoom level style for a lower zoom level than the first zoom level.

When displaying map data in a perspective view, additional map tiles may be displayed at the first zoom level, using successively lower zoom level styles that are interpolated between the highest zoom level style and the lowest zoom level style.

In another embodiment, at block 806, the second map tile may have a nominal use at a zoom level other than the first zoom level and the second map tile is displayed using the first zoom level style. Using the example above for illustration, the second map tile may be designated for use at the zoom level 16 and may be displayed using the zoom level style for zoom level 15. See, e.g., FIG. 5B and related description above.

In one embodiment, the second map data may be displayed at zoom level 16, using style information for zoom level 15 while the graphical information for the second map data is being downloaded. The second map tile may be displayed using the second zoom level style, e.g., the style for zoom level 16 when all the data for the second map tile has been completely received. If appropriate, all map tiles may be changed to the zoom level style for the new zoom level after all associated map tile data in the display area is received.

Some legacy applications use a map data server and a map rendering server (not illustrated) to retrieve map data and render one or more map tiles before sending the rendered image to a client device. The same concepts discussed above are equally applicable to this server-side rendering environment. That is, style information for one zoom level may be used to render map vector data for another zoom level if intermediate rendered images are to be supplied to a client, or if a network interruption or high latency causes the map data to be lost or delayed.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of rendering graphical map information of map tiles on a display of a computer device using zoom level-specific styles, the method comprising:
receiving style information specifying zoom level styles for each of a plurality of zoom levels;
receiving a first map tile of graphical map information, the first map tile associated with nominal use at a first zoom level;
displaying the first map tile of graphical map information on a portion of the display of the computer device at the first zoom level using a zoom level style corresponding to the first zoom level;
receiving a second map tile of graphical information associated with use at a nominal zoom level;
displaying the second map tile of graphical map information on a second portion of the display of the computer device at the same time as displaying the first map tile, wherein displaying the second map tile comprises:
determining a zoom level style associated with the nominal zoom level of the second map tile; and
displaying the second map tile of graphical map information using a zoom level style different from the zoom level style associated with the nominal use of the second map tile.

2. The method of claim 1, wherein the second map tile has a nominal use at the first zoom level and displaying the second map tile comprises displaying the second map tile using a zoom level style corresponding to a zoom level other than the first zoom level.

3. The method of claim 1, wherein the displaying the first map tile comprises displaying the first map tile using an interpolation of zoom level styles across the first map tile to create a perspective view of the first map tile.

4. The method of claim 3, wherein the second map tile is displayed graphically above the first map tile and the second map tile is displayed using a zoom level style for a lower zoom level than the first zoom level.

5. The method of claim 4, further comprising displaying a third or more map tiles at the same time as displaying the first and second map tiles, wherein the third or more map tiles are displayed using an interpolated set of zoom styles from the zoom level style corresponding to the first zoom level to another zoom level style associated with a zoom level two or more zoom levels lower than the first zoom level.

6. The method of claim 1, wherein the second map tile is displayed graphically above the first map tile and the second map tile is displayed using a zoom level style for a lower zoom level than the first zoom level.

7. The method of claim 1, further comprising displaying a third or more map tiles at the same time as displaying the first and second map tiles, wherein the third or more map tiles are displayed using an interpolated set of zoom styles from the zoom level style corresponding to the first zoom level to another zoom level style associated with a zoom level two or more zoom levels lower than the first zoom level.

8. The method of claim 1, wherein the second map tile has a nominal use at a zoom level other than the first zoom level and displaying the second map tile comprises displaying the second map tile using the zoom level style for the first zoom level.

9. The method of claim 8, wherein displaying the second map tile using the zoom level style for the first zoom level comprises displaying the second map tile using the zoom level style for the first zoom level while graphical map information for the second map tile is being received.

10. The method of claim 9, further comprising displaying the second map tile using the second zoom level style after the graphical map information for the second map tile is completely received.

11. A method in a map client at a client device for rendering a map image at discrete zoom levels, the method comprising:

receiving, at the client device, style information including zoom level specific styles for rendering map data at each discrete zoom level;

receiving, at the client device, first map data designated for display at a first zoom level;

displaying the first map data at the first zoom level using a first zoom level style corresponding to the first zoom level;

receiving, at the client device, a second map data designated for display at a second zoom level;

displaying, contemporaneously with and contiguous to the first map data, the second map data, wherein the second map data is displayed using the first zoom level style.

12. The method of claim 11, wherein displaying the second map data designated for the second zoom level using the first zoom level style comprises displaying an incomplete portion of the second map data using the first zoom level style before a complete second map data is available.

13. The method of claim 12, further comprising changing the style of the second map data from the first zoom level style to the second zoom level style after the complete second map data is available.

14. The method of claim 11, wherein displaying the second map data using the first zoom level style comprises changing the style of the second map data from a second zoom level style to the first zoom level style until a new tile of map data replaces the second map data, the new tile of map data being designated for display at the first zoom level using the first zoom level style.

15. The method of claim 14, wherein the first zoom level is two or more zoom levels removed from the second zoom level.

16. The method of claim 11, wherein displaying the second map data using the first zoom level style comprises:

displaying the second map data using the first zoom level style while the second zoom level style is being downloaded; and displaying the second map data using the second zoom level style after the second zoom level style is downloaded and available.

17. A client device adapted to execute software code on a processor to display map data on a display of the client device, the client device comprising:

a first module executed on the processor that receives map tile information and style data by zoom level, each map tile having a corresponding style data specifying style information unique to each zoom level;

a second module executed on the processor that receives user input from a user interface including an indication to change from a first zoom level to a second zoom level;

a third module executed on the processor that i) displays a first map tile with data for the first zoom level at the first zoom level using style information for the first zoom level and ii) concurrently displays a second map tile with graphical information for a second zoom level at the first zoom level using, at least in part, style information for the first zoom level.

18. The client device of claim 17, wherein the third module displays a portion of the second map tile using the style information for the first zoom level during a time when the second map tile is downloading, wherein the third module displays the second map tile using style information for the second zoom level after the second map tile is downloaded in full.

19. The client device of claim 17, wherein the second zoom level is two or more zoom levels removed from the first zoom level.

20. The client device of claim 19, wherein the third module displays the second map tile using the style information for the first zoom level until a new map tile replaces the second map tile, the new map tile designated for display at the first zoom level using the style information for the first zoom level.

* * * * *